(12) United States Patent
Chipper

(10) Patent No.: US 6,249,374 B1
(45) Date of Patent: *Jun. 19, 2001

(54) WIDE FIELD OF VIEW INFRARED ZOOM LENS ASSEMBLY HAVING A CONSTANT F/NUMBER

(75) Inventor: Robert B. Chipper, Allen, TX (US)

(73) Assignee: Raytheon Company, Lexington, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/786,944

(22) Filed: Jan. 23, 1997

Related U.S. Application Data

(60) Provisional application No. 60/012,815, filed on Mar. 4, 1996.

(51) Int. Cl.[7] ............................ G02B 13/14; G02B 15/14
(52) U.S. Cl. ...................... 359/356; 359/354; 359/566; 359/357; 359/676
(58) Field of Search ................................. 359/354, 355, 359/356, 357, 565, 566, 742, 676; 250/330, 331

(56) References Cited

U.S. PATENT DOCUMENTS

| | | |
|---|---|---|
| 3,825,315 | 7/1974 | Altman et al. . |
| 3,846,820 | 11/1974 | Lampe et al. . |
| 4,007,978 | 2/1977 | Holton . |
| 4,018,608 | 4/1977 | Frazier . |
| 4,067,641 | 1/1978 | Holton . |
| 4,080,532 | 3/1978 | Hopper . |
| 4,084,130 | 4/1978 | Holton . |
| 4,085,550 | 4/1978 | Graham . |
| 4,142,207 | 2/1979 | McCormack et al. . |
| 4,143,269 | 3/1979 | McCormack et al. . |

(List continued on next page.)

FOREIGN PATENT DOCUMENTS

| | | |
|---|---|---|
| 939943 | 1/1974 | (CA) . |
| 2 251 952 | 7/1992 | (GB) . |
| WO 91/16607 | 10/1991 | (WO) . |

OTHER PUBLICATIONS

U.S. patent application Ser. No. 08/289,404, filed Aug. 12, 1994, "Durable Polomeric Optical Systems", Issuance Pending—Issue Fee paid on Jan. 17, 1997.

Primary Examiner—Audrey Chang
(74) Attorney, Agent, or Firm—Baker Botts L.L.P.

(57) ABSTRACT

A wide field of view infrared zoom lens assembly (16) having a constant F/Number. The wide field of view infrared lens assembly (16) includes a focusing component (33), a collecting component (37), an aperture stop (46), and a diffracting component (41). The focusing component (33) may include a pair of focusing zoom lenses (34, 36). The collecting component (37) may include a first collecting lens (38) and a second collecting lens (40). The focusing component (33) and the collecting component (37) may be formed from high dispersion, low index material. The aperture stop (46) may be mounted to the first collecting lens (38) to maintain a constant F/Number. The diffracting component (41) may include a diffractive surface to correct color aberrations associated with an infrared waveband. The focusing component (33) and the collecting component (37) cooperate with the diffracting component (41) to focus infrared radiation at an image plane (15) of an infrared detector (18).

20 Claims, 2 Drawing Sheets

U.S. PATENT DOCUMENTS

| | | |
|---|---|---|
| 4,162,402 | 7/1979 | Hopper . |
| 4,205,227 | 5/1980 | Reed . |
| 4,275,302 | 6/1981 | Imbert et al. . |
| 4,379,232 | 4/1983 | Hopper . |
| 4,411,732 | 10/1983 | Wotherspoon . |
| 4,431,917 | 2/1984 | Gibbons . |
| 4,447,291 | 5/1984 | Schulte . |
| 4,594,507 | 6/1986 | Elliott et al. . |
| 4,614,957 | 9/1986 | Arch et al. . |
| 4,615,595 | 10/1986 | Hornbeck . |
| 4,621,888 | 11/1986 | Crossland et al. . |
| 4,639,756 | 1/1987 | Rosbeck et al. . |
| 4,679,891 * | 7/1987 | Roberts ................................ 359/357 |
| 4,684,812 | 8/1987 | Tew et al. . |
| 4,705,361 | 11/1987 | Frazier et al. . |
| 4,710,732 | 12/1987 | Hornbeck . |
| 4,751,387 | 6/1988 | Robillard . |
| 4,877,317 | 10/1989 | Gibbons et al. . |
| 4,948,976 | 8/1990 | Baliga et al. . |
| 4,956,619 | 9/1990 | Hornbeck . |
| 4,965,649 | 10/1990 | Zanio et al. . |
| 4,994,672 | 2/1991 | Cross et al. . |
| 5,010,251 | 4/1991 | Grinberg et al. . |
| 5,021,663 | 6/1991 | Hornbeck . |
| 5,047,644 | 9/1991 | Meissner et al. . |
| 5,051,591 | 9/1991 | Trotta et al. . |
| 5,061,049 | 10/1991 | Hornbeck . |
| 5,083,857 | 1/1992 | Hornbeck . |
| 5,113,076 | 5/1992 | Shulte . |
| 5,132,848 | 7/1992 | Nishio et al. . |
| 5,144,138 | 9/1992 | Kinch et al. . |
| 5,188,970 | 2/1993 | York et al. . |
| 5,196,703 | 3/1993 | Keenan . |
| 5,229,880 * | 7/1993 | Spencer et al. ....................... 359/353 |
| 5,238,530 | 8/1993 | Douglas et al. . |
| 5,257,133 * | 10/1993 | Chen .................................... 359/356 |
| 5,264,326 | 11/1993 | Meissner et al. . |
| 5,313,331 | 5/1994 | Mihara . |
| 5,346,532 | 9/1994 | Sinclair et al. . |
| 5,424,869 | 6/1995 | Nanjo . |
| 5,493,441 | 2/1996 | Chipper . |
| 5,504,628 * | 4/1996 | Borchard .............................. 359/356 |
| 5,559,332 | 9/1996 | Meissner et al. . |
| 6,018,414 * | 1/2000 | Chipper .................................. 359/56 |

\* cited by examiner

WIDE FIELD OF VIEW INFRARED ZOOM LENS ASSEMBLY HAVING A CONSTANT F/NUMBER

This application claims the benefit of Provisional No. 60/012,815 filed Mar. 4, 1996.

RELATED APPLICATION

This application is related to copending U.S. patent application Ser. No. 08/181,263 filed Jan. 13, 1994 entitled "INFRARED CONTINUOUS ZOOM TELESCOPE USING DIFFRACTIVE OPTICS", now U.S. Pat. No. 5,495,441, copending U.S. patent application Ser. No. 08/788,070 filed Jan. 23, 1997 entitled "DUAL BAND INFRARED LENS ASSEMBLY USING DIFFRACTIVE OPTICS"; copending U.S. patent application Ser. No. 08/786,945 filed Jan. 23,1997 entitled "DUAL PURPOSE INFRARED LENS ASSEMBLY USING DIFFRACTIVE OPTICS"; and copending U.S. patent application Ser. No. 08/786,951 filed Jan. 23, 1997 entitled "INFRARED ZOOM LENS ASSEMBLY HAVING A VARIABLE F/NUMBER".

TECHNICAL FIELD OF THE INVENTION

This invention relates generally to optical systems, and more particularly to a wide field of view infrared zoom lens assembly having a constant F/Number.

BACKGROUND OF THE INVENTION

Infrared or thermal imaging systems typically use a plurality of thermal sensors to detect infrared radiation and produce an image capable of being visualized by the human eye. Thermal imaging systems typically detect thermal radiance differences between various objects in a scene and display these differences in thermal radiance as a visual image of the scene. Thermal imaging systems are often used to detect fires, overheating machinery, planes, vehicles and people, and to control temperature sensitive industrial processes.

The basic components of a thermal imaging system generally include optics for collecting and focusing infrared radiation from a scene, an infrared detector having a plurality of thermal sensors for converting infrared radiation to an electrical signal, and electronics for amplifying and processing the electrical signal into a visual display or for storage in an appropriate medium. A chopper is often included in a thermal imaging system to modulate the infrared radiation and to produce a constant background radiance which provides a reference signal. The electronic processing portion of the thermal imagining system will subtract the reference signal from the total radiance signal to produce a signal with minimum background bias.

Thermal imaging systems may use a variety of infrared detectors. An infrared detector is a device that responds to electromagnetic radiation in the infrared spectrum. Infrared detectors are sometimes classified into two main categories as cooled and uncooled. A cooled infrared detector is an infrared detector that must be operated at cryogenic temperatures, such at the temperature of liquid nitrogen, to obtain the desired sensitivity to variations in infrared radiation. Cooled detectors typically employ thermal sensors having small bandgap semiconductors that generate a change in voltage due to photoelectron interaction. This latter effect is sometimes called the internal photoelectric effect.

Uncooled infrared detectors cannot make use of small bandgap semiconductors because dark current swamps any signal at room temperature. Consequently, uncooled detectors rely on other physical phenomenon and are less sensitive than cooled detectors. However, because uncooled detectors do not require the energy consumption of cooled detectors, they are the preferred choice for portable, low power, applications where the greater sensitivity of cooled detectors is not needed. In a typical uncooled thermal detector, infrared photons are absorbed and the resulting temperature difference of the absorbing element is detected. Thermal detectors include a pyroelectric detector, a thermocouple, or a bolometer.

An infrared window is a frequency region in the infrared spectrum where there is good transmission of electromagnetic radiation through the atmosphere. Typically, infrared detectors sense infrared radiation in the spectral bands from 3 to 5 microns (having an energy of 0.4 to 0.25 eV) and from 8 to 14 microns (having an energy of 0.16 to 0.09 eV). The 3 to 5 micron spectral band is generally termed the "near infrared band" while the 8 to 14 micron spectral band is termed the "far infrared band." Infrared radiation between the near and far infrared bands cannot normally be detected due to atmospheric absorption of the same.

Infrared radiation is generally focused onto a thermal detector by one or more infrared lenses. Infrared lens assemblies may be classified as zoom or single field of view and as wide or narrow field of view. A wide field of view infrared zoom lens may employ a fixed or a variable aperture stop. A fixed aperture stop allows a infrared zoom lens to maintain a constant F/Number, and thus a constant sensitivity, over the zoom range. Wide field of view infrared zoom lenses having a fixed aperture stop, however, are typically expensive to manufacture due to the number and size of lens elements and to the materials needed to construct the lens elements.

SUMMARY OF THE INVENTION

In accordance with the present invention, a wide field of view infrared zoom lens assembly having a constant F/Number is provided that substantially eliminates or reduces the disadvantages and problems associated with prior infrared detection systems.

In accordance with the present invention, a wide field of view infrared lens assembly is provided with a plurality of components located along an optical axis to focus infrared radiation of an object. A focusing component includes a pair of focusing zoom lenses. The focusing lenses may be formed of a high dispersion, low index material. A collecting component includes at least one collecting lens that may also be formed of high dispersion, low index material. An aperture stop may be located along the optical axis in a fixed location. A diffracting component includes at least one diffractive surface that may be employed to correct color aberrations associated with an infrared waveband. The focusing and collecting components cooperate with the diffractive component to focus infrared radiation of the object onto an image plane of an associated infrared detector.

More specifically, the collecting lens may be located proximate to the image plane. In this embodiment, a second collecting lens may be located between the collecting lens and the focusing component. The aperture stop may be mounted to the second collecting lens.

In accordance with another aspect of the present invention, a diffractive lens incorporating the diffractive surface may be removably mounted in the wide field of view infrared lens assembly. To reduce costs, the diffractive lens may be formed from an inexpensive polymer. The high dispersion, low index material of the focusing and collecting lenses may be chalcogenide glass or other material having infrared transmitting properties that change minimally between the near and far infrared wavebands.

Important technical advantages of the present invention include providing a relatively low cost wide field of view infrared zoom lens assembly having a constant F/Number, and thus a constant sensitivity, over the zoom range. In particular, the location of the aperture stop minimizes the front lens diameter and allows the lens assembly to have a constant, very fast F/Number. Thus, the present invention eliminates the cost associated with large lenses for wide field of view applications.

Another important technical advantage of the present invention includes providing a wide field of view infrared zoom lens assembly operable in the near and far infrared wavebands. Thus, separate wide field of view infrared lens assemblies need not be designed and fabricated for use in the near and far infrared wavebands.

Other technical advantages will be readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1:
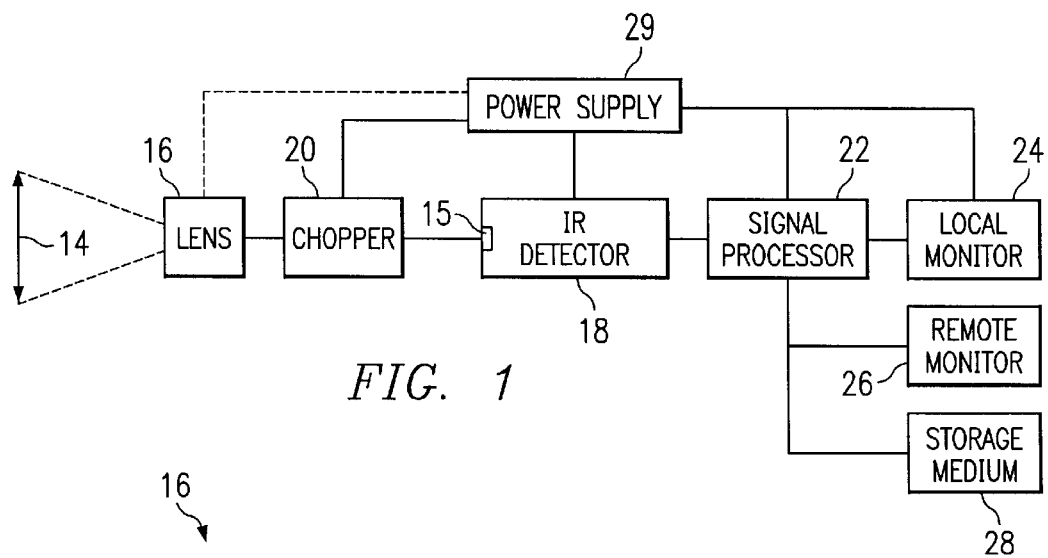
FIG. 1 is a block diagram of an infrared imaging system with a wide field of view infrared zoom lens assembly having a constant F/Number in accordance with the present invention.

The preferred embodiments of the present invention and its advantages are best understood by referring to FIGS. 1 through 3 of the drawings, in which like numerals refer to like parts throughout the several views. FIG. 1 shows a schematic block diagram of an infrared imaging system 12 for detecting, processing, and displaying the heat image of an object 14. The infrared imaging system 12 may be used to detect fires, overheating machinery, planes, vehicles and people, and to control temperature sensitive industrial processes.

As shown by FIG. 1, the infrared imaging system 12 comprises a wide field of view zoom lens assembly 16 in optical communication with an infrared detector 18. The infrared detector 18 senses infrared radiation, typically, in the spectral bands from 3 to 5 microns (having an energy of 0.4 to 0.25 eV) and from 8 to 14 microns (having an energy of 0.16 to 0.09 eV). The 3 to 5 micron spectral band is generally termed the "near infrared band" while the 8 to 14 micron spectral band is termed the "far infrared band." Infrared radiation between the near and far infrared bands cannot normally be detected due to atmospheric absorption.

The wide field of view zoom lens assembly 16 focuses or directs infrared radiation emitted by the object 14 onto an image plane 15 of the infrared detector 18. In cases where an uncooled detector 18 is used, a chopper 20 is often disposed between the wide field of view lens assembly 16 and the infrared detector 18. The chopper 20 may be controlled by a signal processor 22 to periodically interrupt transmission of the infrared image to the image plane 15 of the infrared detector 18. The chopper 20 may be a rotating disk with openings that periodically block and let pass infrared radiation.

The infrared detector 18 translates incoming infrared radiation into one or more images and corresponding electrical signals for processing. Electrical signals are fed to the signal processor 22, which assembles electrical signals into video signals for display. As previously described, the signal processor 22 may also synchronize operation of the chopper 20. This synchronization enables the signal processor 22 to subtractively process incoming infrared radiation to eliminate both fixed infrared background radiation and time constant noise. The output of the signal processor 22 is often a video signal that may be viewed, further process, stored, or the like.

The video signal may be viewed on a local monitor 24 or fed to a remote monitor 26 for display. The local monitor 24 may be an eye piece containing an electronic viewfinder, a cathode ray tube, or the like. Similarly, the remote monitor 26 may comprise an electronic display, a cathode ray tube, such as a television, or other type of device capable of displaying the video signal. The video signal may also be saved to a storage medium 28 for later recall. The storage medium 28 may be a compact disk, a hard disk drive, random access memory, or any other type of medium capable of storing electronic video signals for later recall. Monitors and storage mediums are well known in the art and therefore will not be further described herein.

Electrical power to operate the infrared imaging system 12 may be provided by a power supply 29. The power supply 29 provides electrical power directly to the chopper 20, the infrared detector 18, the signal processor 22, and to the local monitor 24. Electrical power may also be provided to the wide field of view zoom lens assembly 16, when, for example, a motor is employed to zoom the lens assembly 16.

Figure 2A:
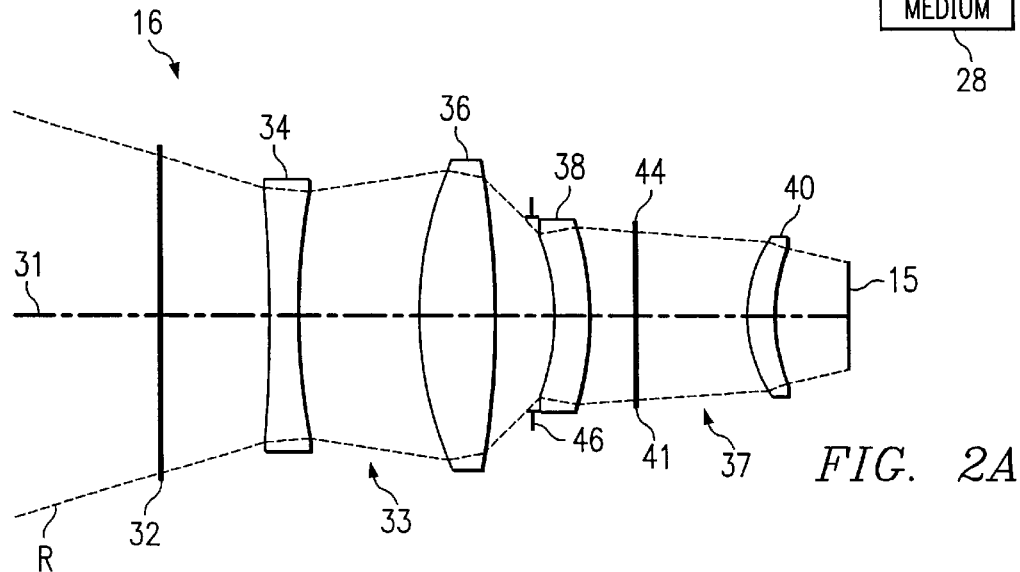
FIGS. 2A–B are schematic drawings of the wide field of view infrared zoom lens assembly of FIG. 1.
Figure 2B:
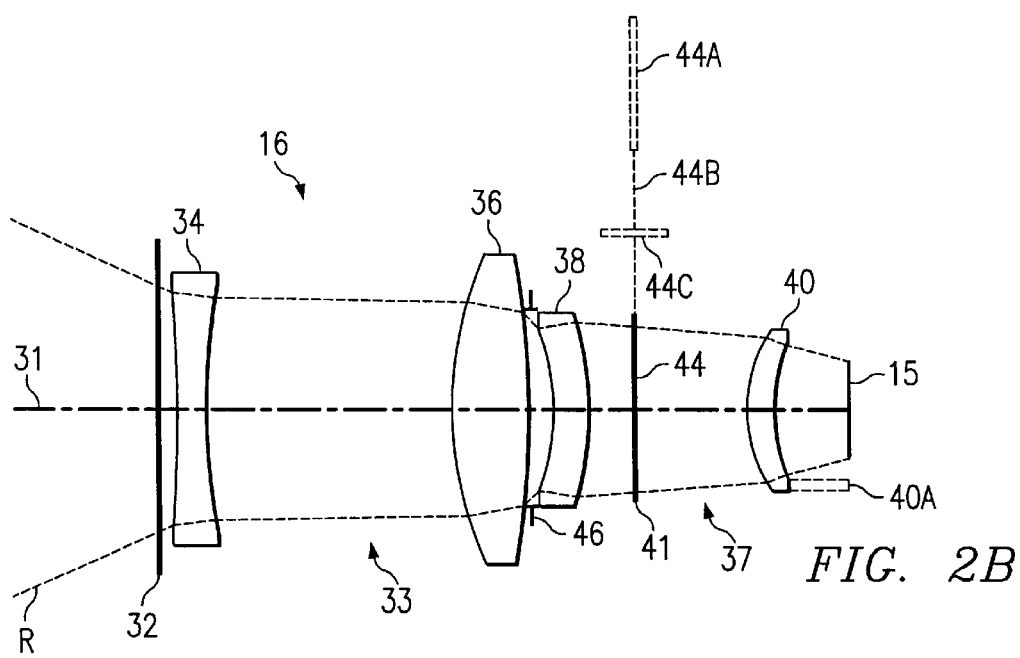
Figure 3A:
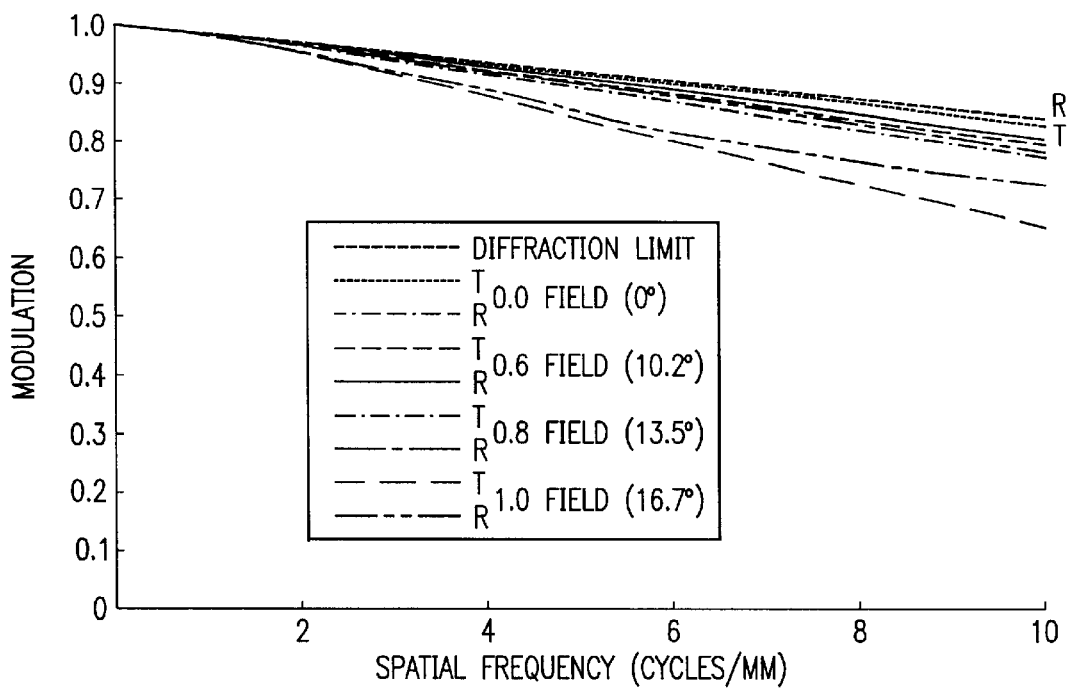
FIGS. 3A–B are frequency drawings of the wide field of view infrared zoom lens assembly of FIGS. 2A–B, showing modulation transfer function performance of the lens, which is a measure of contrast, versus spatial frequency.
Figure 3B:
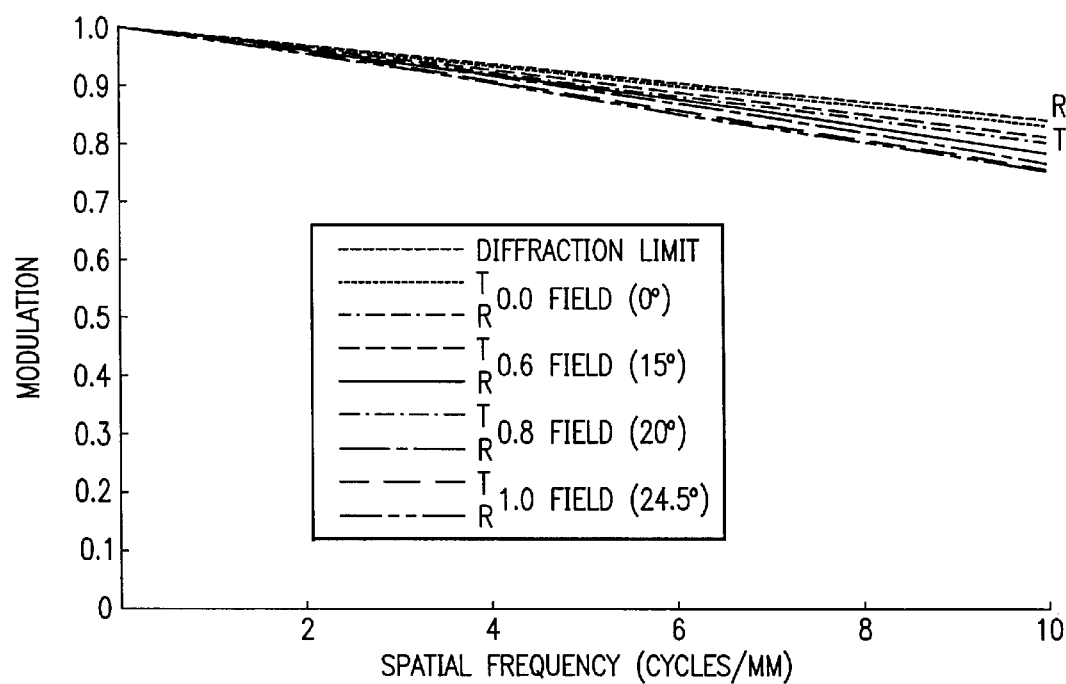

FIGS. 2A–B are schematic drawings of the wide field of view zoom lens assembly 16 incorporating an embodiment of the present invention. In this embodiment, wide field of view zoom lens assembly 16 may be generally described as a zoom lens having a retracted position shown in FIG. 2A and an extended position shown in FIG. 2B. Preferably, zoom lens assembly 16 is approximately 127 millimeters in overall length and operable over a horizontal field of view of twenty-seven to forty degrees (27°–40°) and yielding a 1.5:1 zoom ratio with a 4:3 aspect ratio. Graphs of the performance of the wide field of view zoom lens assembly 16 verses spacial frequency are shown for the retracted zoom position in FIG. 3A and for the extended zoom position in FIG. 3B.

As shown by FIGS. 2A–B, the various components of the wide field of view zoom lens assembly 16 are positioned along an optical axis 31. Wide field of view zoom lens assembly 16 comprises a focusing component 33 including a pair of zoom lenses 34 and 36. A collecting component 37 includes a pair of fixed collecting lenses 38 and 40. A diffracting component 41 includes a diffractive lens 44. A protective window 32 may also be provided to prevent dust and other elements from entering and damaging the wide field of view zoom lens assembly 16.

In accordance with conventional practice, the radius of curvature of the lens elements will be defined as positive if the center of curvature lies to the right of the lens element and will be defined as negative if the center of curvature lies to the left of the lens element along optical axis 31. A lens element will be defined as converging if the lens focussing power causes parallel light rays to converge, and will be defined as diverging if the lens focussing power causes parallel light rays to appear to originate from a virtual focus. Further, a side of a lens will be defined as a first side if facing the object 14 and will be defined as a second side if facing the image plane 15.

For the embodiment of FIGS. 2A–B, focusing zoom lens 34 is a negative diverging lens while focusing zoom focusing lens 36 is a positive converging lens. Focusing zoom lenses 34 and 36 are movably installed in wide field of view lens assembly 16 and move relative to each other in a nonlinear fashion. As best shown by comparison of FIGS. 2A–B, as wide field of view zoom lens assembly 16 is zoomed, zoom lenses 34 and 36 move away from window 32 toward the collecting lens 38. Collecting lens 38 is a negative diverging lens while collecting lens 40 is a positive converging lens. Focusing zoom lenses 34 and 36 and collecting lenses 38 and 40 cooperate with diffractive lens 44, which is discussed below in detail, to focus infrared radiation emitted by object 14 onto the image plane 15 of the infrared detector 18. Preferably, infrared detector 18 is an uncooled detector for use in connection with wide field of view zoom lens assembly 16.

An aperture stop 46 may be mounted to a first side of collecting lens 38. The aperture stop 46 determines the diameter of the cone of energy that the wide field of view zoom lens assembly 16 will accept by limiting the passage of infrared energy through the lens. The cone of energy that the wide field of view zoom lens assembly 16 will accept is shown by ray trace R.

The aperture stop 46 is stationary with fixed collecting lens 38. The location of the aperture stop 46 minimizes the front lens diameter and allows the wide field of view lens assembly 16 to have a constant, very fast F/Number. Accordingly, there is no change in sensitivity throughout the zoom range. As used herein, the phrase "fast F/Number" means a F/Number of less than 1.2. For the embodiment shown in FIGS. 2A–B, the F/Number may be approximately 1.2 throughout the zoom range.

The focusing zoom lenses 34 and 36 and the collecting lenses 38 and 40 may be constructed of a single material having infrared transmitting properties that change minimally between the near and far infrared wavebands. This construction will allow the wide field of view zoom lens assembly 16 to be used in both the near and the far infrared wavebands.

The material may be a glass or a similar type of infrared transmitting material having a high dispersion rate and a low refractive index. The refractive index of a material is the ratio of the speed of light in a vacuum (essentially the same as in air) to the speed of light in the material. The dispersion rate of a material is the rate of change of the refractive index of the material with respect to a wavelength. The dispersion rate may be expressed as an Abbe V-number, which is a measure of the reciprocal relative dispersion. Thus, a high dispersion rate corresponds to a low Abbe V-number and visa-versa. As used herein, the phrase "low refractive index" means a refractive index of less than 3.3. The phrase "high dispersion rate," as used herein, means an Abbe V-number of less than 200.

Materials having a high dispersion rate and a low refractive index include Gallium Arsenide (GaAs) and chalcogenide glass, such as TI 1173 manufactured by Texas Instruments Incorporated. Germanium, which is often the preferred material for far infrared lenses, has a low dispersion rate in the far infrared band and a high refractive index. Germanium is preferred in other infrared lens applications because lenses having a high refractive index need less curvature than lenses with a lower refractive index. Thus, use of a high index material makes it is easier to correct for image aberrations such as spherical, coma, and astigmatism.

The properties of TI 1173, Gallium Arsenide, and Germanium in the near and far infrared bands are listed below in Table 1. In Table 1, the Abbe V-number is a measure of the reciprocal relative dispersion of the material.

TABLE 1

| | INDEX | | ABBE V-NUMBER | |
|---|---|---|---|---|
| | | | Far Infrared | Near Infrared |
| Material | 10 Micron | 4 Micron | Band | Band |
| TI1173 | 2.604 | 2.622 | 108 | 169 |
| GaAs | 3.278 | 3.307 | 108 | 146 |
| Ge | 4.003 | 4.025 | 991 | 102 |

From Table 1, for a high dispersion, low index material such as TI 1173, the properties change very little between the near and far infrared wavebands. Accordingly, the wide field of view zoom lens assembly 16 is equally applicable to the near and far infrared bands.

As previously discussed, low index materials, such as TI 1173, have a reduced capacity to bend light. To compensate, the lens elements of wide field of view zoom lens assembly 16 have larger curvatures than would otherwise be used. Consequently, it may be more difficult to reduce image degrading aberrations, such as spherical, coma, and astigmatism. To reduce such image degrading aberrations, focusing zoom lenses 34 and 36 and collecting lenses 38 and 40 include aspheric surfaces. The general equation for an aspheric surface is:

$$Z = \frac{(CC)Y^2}{1 + [1 - (1+K)(CC)^2 Y^2]^{1/2}} + AY^4 + BY^6 + CY^8 + DY^{10}$$

where:

Z is Sag value along the z-axis,

Y is the semi-diameter height;

CC is the base curvature (1/radius) of the surface;

K is the conic coefficient; and

A, B, C and D are the 4th, 6th, 8th and 10th order aspheric coefficients, respectively.

The coefficients of the aspheric surfaces of focusing zoom lenses 34 and 36 and collecting lenses 38 and 40 are listed below in Table 2.

TABLE 2

Aspheric Surface Coefficients

|  | Zoom Lens 34 | Zoom Lens 36 | Collecting Lens 38 | Collecting Lens 40 |
|---|---|---|---|---|
| Curavture (CC) | | | | |
| Surface 1 | −.125237 | .356518 | −.631796 | .929584 |
| Surface 2 | .193420 | −.203421 | −.415241 | .673052 |
| Aspheric Coefficients | | | | |
| K S1 | 0 | 0 | 0 | 0 |
| A4 S1 | −.178338E−1 | −.105827E−1 | .194364E−1 | 0 |
| A6 S1 | .282393E−1 | −.365435E−4 | .603051E−2 | 0 |
| A8 S1 | −.633229E−3 | .253356E−2 | .267480E−2 | 0 |
| A10 S1 | −.128983E−3 | −.685896E−3 | .158570E−1 | 0 |
| K S2 | 0 | 0 | 0 | 0 |
| A4 S2 | −.274308E−1 | .207420E−1 | −.449866E−1 | .158457E+0 |
| A6 S2 | .299483E−1 | −.365517E−2 | .120503E−1 | −.131179E+0 |
| A8 S2 | −.594812E−2 | .316298E−2 | .221250E−1 | .834328E+0 |
| A10 S2 | .587901E−2 | −.117945E−2 | −.169602E−1 | −.198537E+0 |

The aspheric surfaces of the lens elements may be formed by press molding or by grinding operations. Further information concerning molding of the lens elements is disclosed by commonly assigned U.S. Pat. No. 5,346,523, entitled "METHOD OF MOLDING CHALCOGENIDE GLASS LENSES." Shaping of lenses is well known in the art and therefore will not be further described.

A chalcogenide glass, such as TI 1173, generally has a low DN/DT (delta refractive index/delta temperature) value, which is the rate of change of a material's refractive index with changes in temperature. If a chalcogenide glass or other material having a low DN/DT value is used to construct the lens elements, wide field of view lens assembly 16 may be passively athermalized. That is, constructed to hold focus with changes in temperature without aid of a motor or similar device.

Wide field of view zoom lens assembly 16 may be passively athermalized by mounting collecting lens 40 against a plastic spacer (for example as shown diagrammatically in broken lines at 40A in FIG. 2B). The spacer expands and contracts with temperature changes in relation to the change of the refractive index of the lens elements. Thus, as the temperature changes, and the refractive index of the lens elements change, the spacer expands or contracts to position the collecting lens 40 to where it accounts for the change in refractive index of the lenses.

Diffractive lens 44 comprises an infrared transmitting material having a diffractive surface. The diffractive surface may be a kinoform produced by diamond point turning, patterned and etched, or the like. Kinoforms are diffractive elements whose phase modulation is introduced by a surface relief pattern. The diffractive optical surface results in a step function whose surface is cut back by precisely one wavelength of the light frequency of interest, preferably 4 microns for the near infrared band and 10 microns for the far infrared band, every time their thickness increases by that amount. The general equation for a diffractive surface is:

$$Z = \frac{(CC)*Y^2}{1+\text{SQRT}[1-(1+K)(CC)^2 Y^2]} + AY^4 + BY^6 + CY^8 + DY^{10} +$$

$$[HOR]*\left(\frac{C1Y^2 + C2Y^4 + C3Y^6}{(N1-N2)} - \frac{\lambda}{N1-N2}*\text{INT}\frac{[C1Y^2 + C2Y^4 + C3Y^6]}{\lambda}\right)$$

where:
Z is Sag value along the Z-axis or optical axis;
Y is the semi-diameter height;
CC is the base curvature (1/radius) of the surface;
K is the conic coefficient of surface;
A,B,C, and D are the 4th, 6th, 8th and 10th order aspheric coefficients, respectively;
HOR is the diffraction order, generally 1 or −1;
λ is the design wavelength for surface;
N1 is the Refractive index of material preceding diffractive surface;
N2 is the Refractive index of material following diffractive surface; and
C1, C2, and C3 are coefficients for describing aspheric phase departure.

The diffractive kinoform surface coefficients of diffractive lens 44 are listed below in Table 3.

TABLE 3

DIFFRACTIVE KINOFORM SURFACE COEFFICIENT

| Parameter | Diffractive Lens 44 |
|---|---|
| HOR | −1 |
| λ (inches) | 4 e−4 |
| N1 | 1.5 |
| N-2 | 1.0 |
| CC (inches) | 0 |
| K | 0 |
| A | 0 |
| B | 0 |
| C | 0 |
| D | 0 |
| C1 | 1.4106E−02 |
| C2 | 0 |
| C3 | 0 |

Further information concerning kinoform diffractive surfaces is disclosed by commonly assigned U.S. patent application Ser. No. 08/181,263, filed Jan. 13, 1994, and entitled "INFRARED CONTINUOUS ZOOM TELESCOPE USING DIFFRACTIVE OPTICS," which is hereby incorporated by reference.

As shown by FIGS. 2A–B, diffractive lens 44 may be positioned between collecting lenses 38 and 40 to control color. Specifically, diffractive lens 44 may correct color focusing aberrations. To keep the cost of the wide field of view zoom lens assembly 16 down, the diffractive lens 44 may be constructed of an inexpensive polymer material such as that described in commonly assigned U.S. patent application Ser. No. 08/289,404 filed Aug. 12, 1994, which is hereby incorporated by reference.

Although wide field of view zoom lens assembly 16 includes only a single diffractive surface for color correction, it will be understood by those skilled in the art that a pair of diffractive surfaces may be used in accordance with the present invention. Moreover, a pair of diffractive surfaces may correct color aberrations better than the single diffractive surfaces employed by the wide field of view zoom lens assembly 16. Additionally, although the diffractive surface is formed on a separate diffractive lens 44, it will be understood by those skilled in the art that the diffractive surface can be formed on a second side of a lens element.

Diffractive lens 44 is designed to correct color in the near infrared waveband or in the far infrared waveband. As previously described, the light frequency of interest by which the diffractive surface is cut by one wavelength is 4 microns for the near infrared band. The light frequency of interest for the far infrared waveband is 10 microns. Accordingly, the diffractive lens 44 may be removably mounted in the wide field of view zoom lens assembly 16 so that it may be removed and replaced with a diffractive lens for a different infrared waveband. This would allow wide field of view zoom lens assembly 16 to be switched between the near and far infrared wavebands by exchanging only the diffractive lens 44.

If desired, alternate diffractive lenses for the near and far infrared bands can be selectably mounted on a filter wheel. For example, as shown in broken lines in FIG. 2B, the diffractive lens 44 and an alternate diffractive lens 44A may be mounted on a filter wheel 44B rotatable about an axis 44C, so that the system can be switched between the near and far infrared bands by rotating the filter wheel 44B to exchange the positions of lenses 44 and 44A. The lens 44A has thereon an alternate diffractive surface. In this configuration, the dual band can be combined with a dual band detector to form a dual band infrared imaging system that can be switched between the near and far infrared bands to better perceive a heat source under prevailing conditions.

Though the present invention and its advantages have been described in detail, it should be understood that various changes, substitutions and alterations can be made herein without departing from the spirit and scope of the invention as defined by the appended claims.

What is claimed is:

1. An apparatus comprising an infrared lens system, said infrared lens system including:
a collecting and focusing section and a diffracting section which cooperate to focus infrared radiation at an image plane;
said collecting and focusing section including a plurality of lens elements which are located along an optical axis in optical communication with each other, and which are each made of a material having an Abbe V-number which is less than 200 in each of first and second infrared wavebands that are different, said lens elements including first and second focusing zoom lenses which are supported for movement along the optical axis, and said lens elements further including first and second collecting lenses which are stationarily supported with respect to the optical axis; and
said diffracting section including a diffracting lens having thereon a diffractive surface, wherein said diffracting lens can be moved between a first location and a second location in which said diffractive lens is respectively located along the optical axis and spaced from the optical axis, and wherein when said diffracting lens is in the first location, said diffracting lens is in optical communication with said lens elements and said diffractive surface thereon corrects color aberrations in a selected one of the first and second wavebands.

2. An apparatus according to claim 1, wherein said material from which said lens elements are made is a high dispersion, low index material.

3. An apparatus according to claim 2, wherein said high dispersion, low index material is chalcogenide glass.

4. An apparatus according to claim 2, wherein said high dispersion, low index material has an index less than 3.3.

5. An apparatus according to claim 1, wherein said diffracting lens is made from a polymer material.

6. An apparatus according to claim 1, including an aperture stop which is stationarily disposed along the optical axis.

7. An apparatus according to claim 6, wherein said aperture stop is supported on one of said collecting lenses, and wherein said aperture stop has an F/number which is less than 1.2.

8. An apparatus according to claim 1, wherein said first and second focusing zoom lenses and said first and second collecting lenses each have aspheric surfaces thereon.

9. An apparatus according to claim 1, wherein said first and second focusing zoom lenses are disposed on a side of said first and second collecting lenses remote from the image plane, and wherein said diffracting lens is disposed between said first and second collecting lenses.

10. An apparatus according to claim 9, wherein said first focusing zoom lens is a negative diverging lens, and said second focusing zoom lens is a positive converging lens, and wherein said first focusing zoom lens is located on a side of said second focusing zoom lens remote from each of said first and second collecting lenses.

11. An apparatus according to claim 9, including an aperture stop fixedly supported on one of said first and second collecting lenses.

12. An apparatus according to claim 1, including means for passively athermalizing said infrared system.

13. An apparatus according to claim 12, wherein said means for passively athermalizing includes a part which has one of said collecting lenses supported thereon, and which expands and contracts with temperature changes.

14. An apparatus according to claim 1, wherein said diffracting section includes a diffracting element having thereon a diffractive surface, said diffracting element being movable between a third location and a fourth location in which said diffracting element is respectively located along the optical axis and spaced from the optical axis, said diffracting element being in the fourth location when said diffracting lens is in the first location, and said diffracting lens being in the second location when said diffracting element is in the third location, wherein when said diffracting element is in the third location said diffracting element is in optical communication with said lens elements, and wherein said diffractive surfaces on said diffracting lens and said diffracting element each correct color aberrations in a respective one of the first and second wavebands, the first waveband being a near infrared waveband and the second waveband being a far infrared waveband.

15. An apparatus according to claim 14, including a part having said diffracting lens and said diffracting element supported thereon, said part being movable between a first position in which said diffracting lens is in the first location and said diffracting element is in the fourth location, and a second position in which said diffracting lens is in the second location and said diffracting element is in the third location.

16. An apparatus according to claim 14, wherein said diffracting element is a diffracting lens.

17. An apparatus according to claim 1, including an infrared detector responsive to the image formed by said infrared lens system at the image plane.

18. An apparatus according to claim 1, including a chopper disposed between said infrared lens system and said infrared detector.

19. An apparatus comprising an infrared lens system, said infrared lens system including:
   a collecting and focusing section and a diffracting section which cooperate to focus infrared radiation at an image plane;
   said collecting and focusing section including a plurality of lens elements which are located along an optical axis in optical communication with each other, and which are each made of a material having similar optical characteristics in each of first and second infrared wavebands that are different, said lens elements including first and second focusing zoom lenses which are moveable along the optical axis, and said lens elements further including first and second collecting lenses which are stationarily supported with respect to the optical axis; and
   said diffracting section including first and second diffracting lenses respectively having thereon a first diffractive surface and a second diffractive surface, wherein each said diffracting lens can be moved between an operational location and a nonoperational location in which that diffractive lens is respectively located along the optical axis and spaced from the optical axis, said second diffracting lens being in the nonoperational location thereof when said first diffracting lens is in the operational location thereof, and said first diffracting lens being in the nonoperational location thereof when said second diffracting lens is in the operational location thereof; wherein when said first diffracting lens is in the operational location thereof, said first diffracting lens is in optical communication with said lens elements and said first diffractive surface thereon corrects color aberrations in the first waveband; and wherein when said second diffracting lens is in the operational location thereof, said second diffracting lens is in optical communication with said lens elements and said second diffractive surface thereon corrects color aberrations in the second waveband.

20. An apparatus comprising an infrared lens system, said infrared lens system including a collecting and focusing section and a diffracting section which cooperate to focus infrared radiation at an image plane; said collecting and focusing section including a plurality of lens elements which are located along an optical axis in optical communication with each other, and which are each made of a material having an Abbe V-number which is less than 200 in each of a near infrared waveband and a far infrared waveband, said lens elements including first and second focusing zoom lenses which are moveable along the optical axis, and said lens elements further including first and second collecting lenses which are stationarily supported with respect to the optical axis; said diffracting section including a diffracting lens which is removably supported in a position along the optical axis in optical communication with said lens elements, said diffracting lens being selected from the group consisting of:
   a diffracting lens having thereon a near infrared diffractive surface which cooperates with said lens elements to focus radiation in the near infrared waveband at the image plane, said near infrared diffractive surface correcting color aberrations in the near infrared waveband; and
   a diffracting lens having thereon a far infrared diffractive surface which cooperates with said lens elements to focus radiation in the far infrared waveband at the image plane, said far infrared diffractive surface correcting color aberrations in the far infrared waveband.

* * * * *

UNITED STATES PATENT AND TRADEMARK OFFICE
CERTIFICATE OF CORRECTION

PATENT NO.    : 6,249,374 B1
DATED         : June 19, 2001
INVENTOR(S)   : Robert B. Chipper It is certified that error appears in the above-identified patent and that said Letters Patent is hereby corrected as shown below:

<u>Column 1,</u>
Line 13, delete "5,495,441", and insert -- 5,493,441 --.

Signed and Sealed this

Ninth Day of July, 2002

Attest:

Attesting Officer

JAMES E. ROGAN
*Director of the United States Patent and Trademark Office*